J. MÜLLER & E. HILPERT.

Assignors to KOCH SONS & CO.

CLASP FOR BOOKS.

No. 10,133. Reissued June 6, 1882.

Witnesses

Chas. H. Smith

J. Haib

Inventors

Julius Muller.

Edward Hilpert per Lemuel W. Serrell atty

N. PETERS, Photo-Lithographer, Washington, D. C.

UNITED STATES PATENT OFFICE.

JULIUS MÜLLER AND EDWARD HILPERT, OF BERLIN, GERMANY, ASSIGNORS TO KOCH, SONS & CO., OF BROOKLYN, NEW YORK.

CLASP FOR BOOKS.

SPECIFICATION forming part of Reissued Letters Patent No. 10,133, dated June 6, 1882.

Original No. 191,992, dated June 12, 1877. Application for reissue filed January 28, 1882. Patented in England October 30, 1876, No. 4,197.

*To all whom it may concern:*

Be it known that we, JULIUS MÜLLER and EDWARD HILPERT, of the city of Berlin, Prussia, Germany, have jointly invented an Improved Clasp or Lock for Books, Albums, &c., of which the following is a specification.

The object of this invention is to apply to the book-cover a clasp that will exert a constant pressure to keep the book closed and to prevent its being opened without moving the clasp, so as to unhook it.

The clasp is constructed in two parts, one sliding within the other, one of which is hinged to one of the book-covers in any ordinary manner. The other part is adapted to hook upon or engage with any ordinary projection or catch upon the other book-cover. Between the two parts of the clasp there are springs which tend to shorten the clasp by moving one part on the other. This causes the clasp to hold or lock firmly with the catch of the book-cover. By drawing the moving part against the tension of the springs the clasp can be hooked in closing the book or released from the catch to permit the book to be opened.

Figure 1:
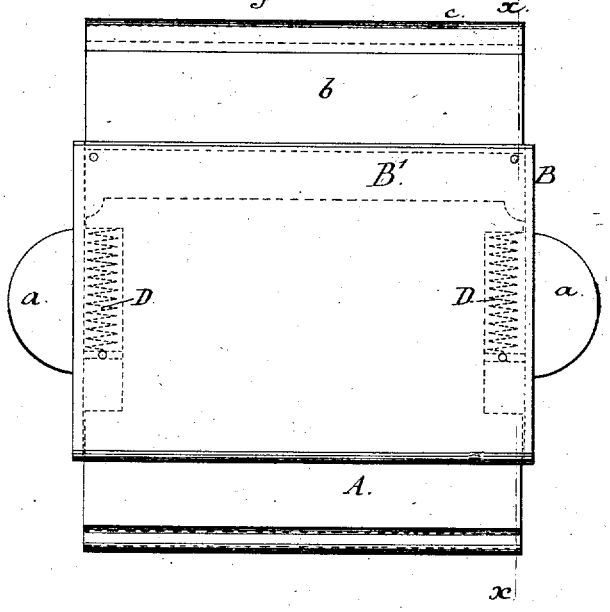
Figure 4:
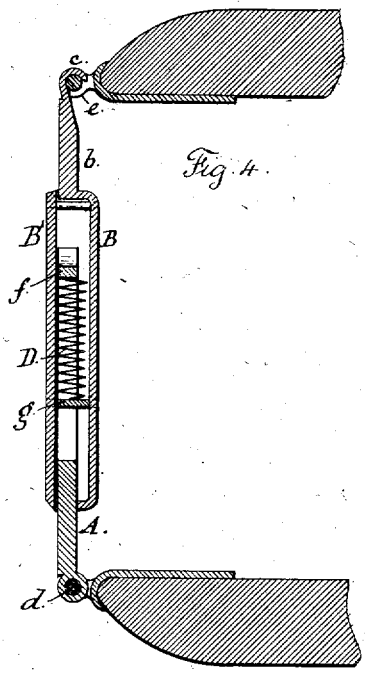
Figure 3:
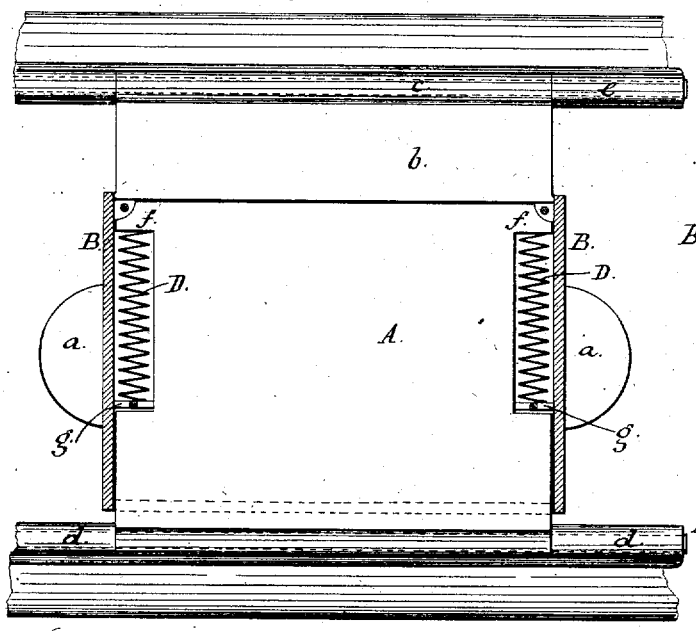
Figure 2:
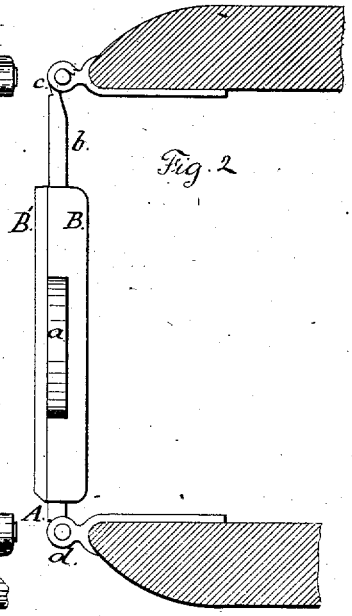

In the accompanying drawings, Figure 1 is a face view of the extensible clasp. Fig. 2 is a side view, representing the clasp applied to the cover of a book. Fig. 3 shows the clasp with the cap-plate removed, and Fig. 4 is a section at the line *x x*.

The clasp consists of two parts or plates, A B, one sliding within the other, and one of which is hinged at *d* to the clip-plate at the edge of one of the book-covers. The part B is made as a shell or case adapted to contain the part A and the springs D. The part B can be slid longitudinally of the clasp. There is at the moving end of the clasp a bent form or hook, *c*, adapted to engage with an ordinary catch or pin, *e*, upon the other book-cover. The springs D exert a constant pressure between the parts A and B to draw the covers toward each other and prevent the clasp being accidentally disengaged from the catch. These springs D are located between the projection *f* on the part A and the projections or pins *g* on the part B. The springs are within the notched edges of the part A, and both the springs and part of A are within the shell-shaped portion of the clasp. The springs serve to hold the clasp closed and obviate the casual disengagement of the same and the opening of the book. The thumb or finger projections allow for the clasp being easily moved in extending the length of the same in closing or opening the book. The case has a removable face-plate, B′, to give access to the portion A. The internal projections, *f g*, act to compress the springs and also to prevent the two parts of the clasp separating when in use.

We are aware that clasps for pocket and other books have been made with spring latches or bolts to catch and hold the parts together, and that springs have been combined with the strap by which the clasp is connected with the book. In our clasp there is no latch, and the clasp itself is provided with springs, that serve to apply a pressure between the edges of the book-covers to draw the same toward each other.

We claim as our invention—

1. The combination, in an album-clasp, of two parts, A B, one part sliding within the other, and springs to move said parts and apply a pressure to keep the covers of the album closed, substantially as set forth.

2. The combination, with the hinge and the catch upon the respective book-covers, of the two-part extensible clasp, one part sliding within the other, connected with such hinge and springs between the two parts of the clasp to apply pressure to the covers of the book or album, as set forth.

3. The combination, with the two-part book-clasps, one part sliding within the other, of springs introduced between the said two parts of the clasp to apply spring-pressure to shorten the clasp and draw the book-covers toward each other, as specified.

4. In a clasp for books and albums, the combination, with the plate A, having projections *f*, of the case B, projections *g*, springs D, and hook *c*, substantially as set forth.

Signed by us this 24th day of December, A. D. 1881.

JULIUS MÜLLER.
EDWARD HILPERT.

Witnesses:
BERTHOLD ROI,
PHILIPP BERG.